(12) United States Patent
Fenner

(10) Patent No.: US 8,973,708 B1
(45) Date of Patent: Mar. 10, 2015

(54) HUNTER'S TREE STAND

(71) Applicant: Steven G. Fenner, Coppell, TX (US)

(72) Inventor: Steven G. Fenner, Coppell, TX (US)

( * ) Notice: Subject to any disclaimer, the term of this patent is extended or adjusted under 35 U.S.C. 154(b) by 0 days.

(21) Appl. No.: 14/014,960

(22) Filed: Aug. 30, 2013

Related U.S. Application Data

(60) Provisional application No. 61/706,873, filed on Sep. 28, 2012.

(51) Int. Cl.
*A01M 31/02* (2006.01)
(52) U.S. Cl.
CPC ..................................... *A01M 31/02* (2013.01)
USPC .............................. 182/128; 182/12; 182/187
(58) Field of Classification Search
CPC ......... A01M 31/02; E04G 1/36; E04G 1/362; E04G 3/24; E04G 3/243; E04G 3/28; B66B 9/08; B66B 9/0807
USPC ......... 182/12, 13, 15, 16, 17, 36, 38, 39, 128, 182/187, 188; 187/201
See application file for complete search history.

(56) References Cited

U.S. PATENT DOCUMENTS

| | | | | |
|---|---|---|---|---|
| 1,197,999 A * | 9/1916 | Beckett | ......................... | 182/187 |
| 2,405,259 A * | 8/1946 | Lamb | ............................... | 182/38 |
| 2,844,187 A * | 7/1958 | Scoville | ......................... | 104/93 |
| 4,911,263 A * | 3/1990 | Kuperman | ...................... | 182/13 |
| 5,090,505 A * | 2/1992 | Amacker | ....................... | 182/187 |
| 5,348,119 A * | 9/1994 | Filkins | ........................... | 182/187 |
| 6,725,972 B1 * | 4/2004 | Krier et al. | .................... | 182/187 |
| 8,540,052 B1 * | 9/2013 | Brown | ........................... | 182/115 |
| 8,833,521 B1 * | 9/2014 | Jude | ............................... | 182/128 |
| 2003/0209388 A1 * | 11/2003 | Arsenault et al. | ............. | 182/187 |
| 2009/0277721 A1 * | 11/2009 | Weir | .............................. | 182/115 |
| 2010/0300806 A1 * | 12/2010 | Ash | ............................... | 182/113 |

* cited by examiner

*Primary Examiner* — Charles A Fox
*Assistant Examiner* — Kristine Florio
(74) *Attorney, Agent, or Firm* — Kenneth L Tolar

(57) ABSTRACT

A tree stand includes an upper support ring formed of a pair of separable, semicircular sections, each having a plurality of brackets depending therefrom. Each bracket includes a slot for receiving an adjustable strap, and a tooth on an inner surface for penetrating a tree trunk. The stand further includes a lower platform likewise formed of a pair of separable, semicircular sections that are fastened to a tree trunk, beneath the support ring. A chair includes pulleys that roll on both the upper ring and the platform to allow a hunter to move the chair a desired position.

13 Claims, 3 Drawing Sheets

HUNTER'S TREE STAND

CROSS REFERENCE TO RELATED APPLICATIONS

This application is entitled to the benefit of provisional patent application No. 61/706,873 filed on Sep. 28, 2012, the specification of which is incorporated herein by reference.

BACKGROUND OF THE INVENTION

The present invention relates to a tree stand having a chair that completely revolves around a tree trunk to place a hunter in an optimal position.

DESCRIPTION OF THE PRIOR ART

Many hunters use a tree stand in order to enhance their view of approaching prey. However, because conventional tree stands are extremely difficult to move, the hunter may be positioned upwind, allowing the hunter's scent to be blown toward nearby game. Therefore, the hunter must either risk discouraging the game from entering the area or endure the burdensome task of disassembling and relocating the stand.

Accordingly, there is currently a need for a tree stand that allows a hunter's position to be easily changed according to wind direction or other factors. The present invention addresses this need by providing a tree stand having a chair that is revolvable about a tree trunk to assure that the hunter is downwind from approaching prey.

SUMMARY OF THE INVENTION

The present invention relates to a tree stand comprising an upper support ring formed of a pair of separable, semicircular sections, each having a plurality of brackets depending therefrom. Each bracket includes a slot for receiving an adjustable strap, and a tooth on an inner surface for penetrating a tree trunk. The stand further includes a lower platform likewise formed of a pair of separable, semicircular sections that are fastened to a tree trunk, beneath the support ring. A chair includes pulleys that roll on both the upper ring and the platform to allow a hunter to move the chair a desired position.

It is therefore an object of the present invention to provide a tree stand that allows a hunter to easily change the position of a chair according to wind direction.

It is another object of the present invention to provide a tree stand that is easy to assemble and relocate.

Other objects, features, and advantages of the present invention will become readily apparent from the following detailed description of the preferred embodiment when considered with the attached drawings and the appended claims.

BRIEF DESCRIPTION OF THE DRAWINGS

FIG. 1 is a side, plan view of the tree stand according to the present invention properly mounted on a tree while FIG. 1A depicts a top view of the perch.

DESCRIPTION OF THE PREFERRED EMBODIMENT

Figures 1, 1A:
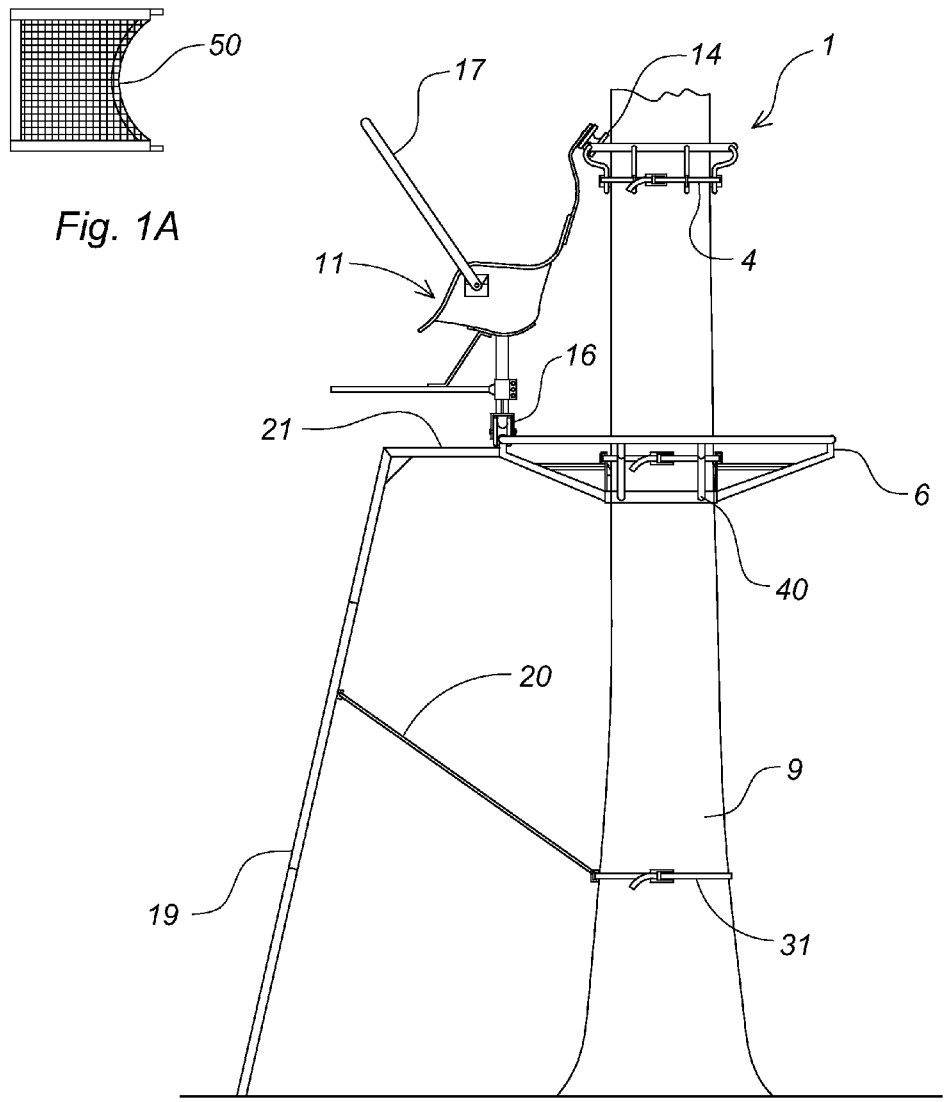
Figure 2:
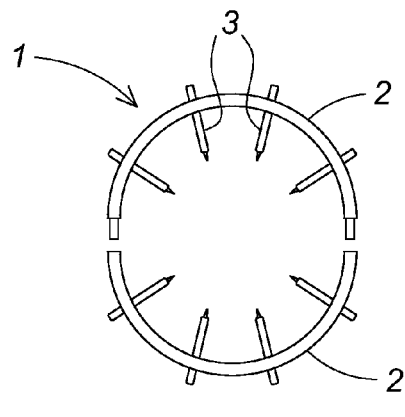
FIG. 2 is an isolated, top view of the upper support ring.
Figure 3:
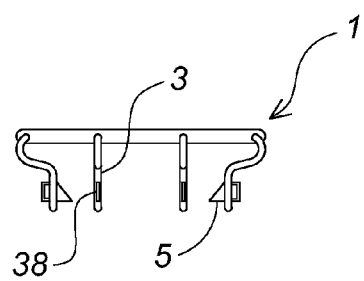
FIG. 3 is an isolated, side view of the upper support ring.
Figure 4:
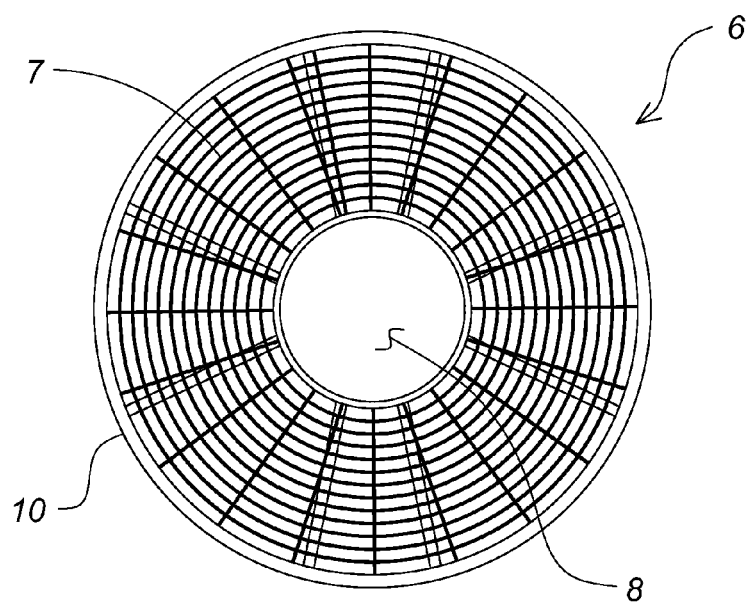
FIG. 4 is an isolated, top view of the lower platform.
Figure 5:
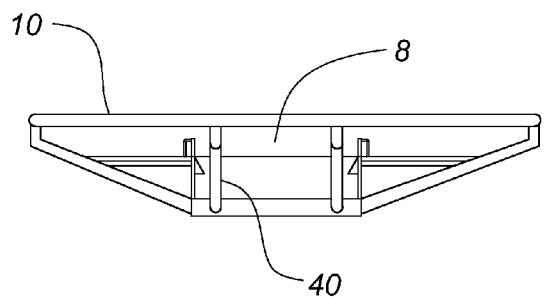
FIG. 5 is an isolated, side view of the lower platform.
Figure 7:
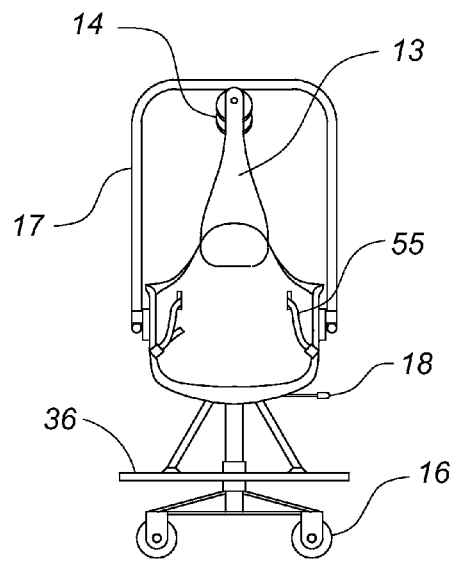
FIG. 7 is an isolated, front view of the chair.
Figure 6:
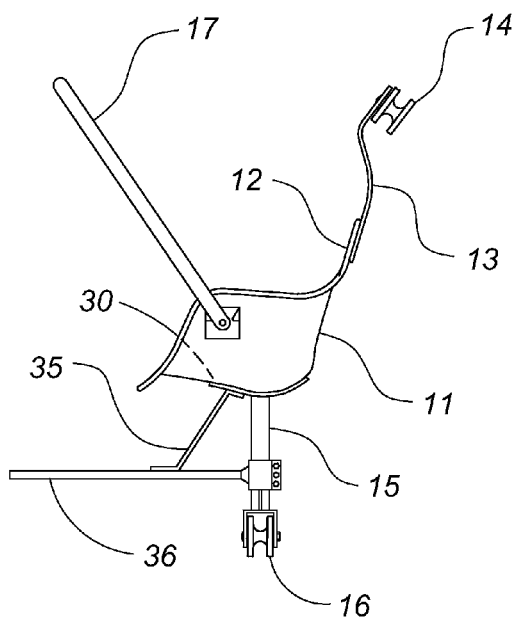
FIG. 6 is an isolated, side view of the chair.

The present invention relates to a hunter's tree stand comprising an upper support ring 1 formed of a pair of separable, semicircular sections 2, each having a plurality of brackets 3 depending therefrom. Each bracket includes a slot 38 for receiving an adjustable strap 4 having ratcheting buckles that allow the strap to be easily tightened about a tree trunk 9. On an inner surface of each bracket is a tooth 5 for penetrating the tree trunk 9 as the straps are tightened.

The stand further includes a lower platform 6 likewise formed of a pair of separable, semicircular sections. The platform includes an upper grid 7 on which a hunter can stand with a plurality of toothed strap brackets 40 depending therefrom. The grid includes a central opening 8 for receiving the tree trunk 9, and a raised, peripheral rim 10 formed of two semicircular, interlocking sections that are connected when the remainder of the platform is assembled.

The platform and upper ring support a hunter's chair 11 having a backrest 12 with an arcuate plate 13 extending upwardly therefrom. At a distal end of the plate is an angled pulley 14 that rides on the inner circumference of the support ring. Depending from a seat portion 30 is a support post 15 having a pair of spaced pulleys 16 attached thereto that roll along the platform's elevated rim 10. Because the chair rides above the grid's outer periphery, equipment, ammunition, weapons and other items can be conveniently stored on the platform without interfering with the chair's movement. The seat portion preferably includes a safety belt 55 for restraining a seated hunter.

The arcuate plate and the angled pulley riding on the inner circumference of the support ring prevent the chair from toppling due to its own weight or that of a seated hunter. The pulleys are constructed with urethane rubber or a similar material so that the pulleys silently roll along the rim and support ring, allowing a hunter to easily relocate the chair without frightening prey. A handbrake 18 locks the pulleys to prevent the chair from moving if the hunter desires.

Extending outwardly from the support post is a footrest 36 that is buttressed by a brace 35 secured to the seat portion. A pivotal, padded safety bar 17 attached to the chair allows a hunter to safely stand when shooting or performing other tasks. In a deployed position, the safety bar is at a height that allows a hunter to rest a gun barrel thereon and which also provides a protective railing when a hunter stands. The safety bar may also be pivoted to a stowed position, wherein it is behind the backrest to provide a hunter with a clearer sight line, if desired.

An extendable ladder 19 is attachable to the lower platform to assist a hunter with erecting and accessing the tree stand. An intermediate portion of the ladder includes a support strut 20 that is anchored to a tree trunk with an adjustable strap 31. At an upper end of the ladder is a perch 21 having an arcuate indention 50 on an edge thereof for conforming to the tree trunk 9. The perch provides a support surface on which a hunter can initially stand when mounting the platform.

To erect the tree stand, a hunter first places the ladder against a tree, ascends the ladder and fastens the lower platform to the tree truck by joining the two sections. The adjustable platform strap is tightened as much as possible with the ratcheting buckles to embed the bracket teeth within the tree trunk. The hunter may then safely stand on the platform to similarly attach the upper support ring at a proper height relative to the platform. A guide bar assists the hunter with spacing the platform and ring so as to properly support the chair pulleys. The upper chair pulley is first placed on the ring and the lower pulleys are subsequently placed on the platform rim. The ladder is then attached to the platform and buttressed with the support strut and corresponding strap. Accordingly, a hunter can easily move the chair about the tree trunk to a desired location.

The above-described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A hunter's tree stand comprising:
    an upper support ring fixed about a tree trunk;
    a continuous platform fixed below said support ring and surrounding said tree trunk, said platform having a raised, peripheral rim;
    a chair having a seat portion with a backrest upwardly extending therefrom, said seat portion having support post depending therefrom, said support post having a first pulley at a distal end that rolls on said peripheral rim, said backrest having a plate upwardly extending therefrom, said plate having an angled second pulley at a distal end that engages an inner circumference of said support ring to prevent said chair from toppling when a hunter is seated therein, whereby said chair freely revolves around said tree.

2. The hunter's tree stand according to claim 1 further comprising a handbrake beneath said seat portion that locks said first pulley and said second pulley to prevent said chair from moving.

3. The tree stand according to claim 2 wherein said platform comprises a central opening that receives said tree trunk.

4. The tree stand according to claim 3 further comprising a footrest extending outwardly from said support post.

5. The tree stand according to claim 4 wherein said footrest is buttressed by a brace secured to said seat portion.

6. The tree stand according to claim 5 further comprising an extendable ladder attachable to the lower platform to assist a hunter with erecting and accessing the tree stand.

7. The tree stand according to claim 6 wherein an intermediate portion of said ladder includes a support strut that is anchored to a tree trunk with an adjustable strap.

8. The tree stand according to claim 6 further comprising a perch at an upper end of said ladder, said perch having an arcuate indention on an edge thereof for conforming to the tree trunk, said perch providing a support surface on which a hunter initially stands when mounting the platform.

9. The tree stand according to claim 1 wherein said first pulley and said second pulley are constructed with rubber so that said first pulley and said second pulley roll silently to allow a hunter to relocate the chair without frightening prey.

10. The tree stand according to claim 1 wherein said support ring includes a plurality of brackets depending therefrom, each of said brackets having a tooth on an inner surface for penetrating a tree trunk to anchor said support ring thereto.

11. The tree stand according to claim 10 wherein each of said brackets further includes a slot with an adjustable strap received therein for further securing said support ring to said tree trunk.

12. The hunter's tree stand according to claim 11 wherein said support ring is formed of a pair of separable, semicircular sections that allow said support ring to be easily mounted around a tree trunk and removed therefrom.

13. The hunter's tree stand according to claim 12 further comprising a pivotal safety bar attached to said chair that allows a hunter to safely stand to perform a desired task.

* * * * *